3,168,590
PROCESS FOR OLEFIN POLYMERIZATION
Joseph R. Kenton, Tulsa, Okla., and Leon M. Adams, San Antonio, Tex., assignors to Standard Oil Company, Chicago, Ill., a corporation of Indiana
No Drawing. Filed Oct. 31, 1961, Ser. No. 148,843
2 Claims. (Cl. 260—683.15)

This invention relates to novel catalyst compositions and a process for their use in the polymerization of olefins. More particularly, it is concerned with the use of such catalysts in preparing olefinic polymer oils.

We have discovered that olefin hydrocarbons, such as for example olefin hydrocarbons having from 2 to 12 carbon atoms, can be polymerized separately or in mixtures under relatively mild conditions in the presence of our new catalysts to produce polymeric oils. Our novel catalysts are prepared from two components; namely, a dialkyl aluminum halide and a dialkyl dihalostannane. These two components are reacted in a molar ratio of at least one mol of the stannane per mol of aluminum compound to produce the catalyst complex which is contacted with the olefin hydrocarbon at mild conditions of temperature and pressure to produce an oily polymer.

In addition, we have found that our new catalyst compositions will dimerize olefin hydrocarbons to selectively produce specific dimers in substantial yield. For example, we have found that ethylene can be dimerized in the presence of diethyl aluminum chloride and dibutyl dichlorostannane in about 1:1 molar ratio, at temperatures in the order of 100° C. and relatively short contact time, to produce a $C_4$ fraction containing greater than 50% butene-1. Selective dimerization is of great utility in the alkylation of hydrocarbons to produce specific alkylates having high octane. For example, in the aluminum chloride-ether catalyzed alkylation of isobutane with butene a substantially higher butylene alkylate is produced if butene-1 is used rather than butene-2 or a mixture of the two.

Since neither a dialkyl dihalostannane nor a dialkyl aluminum halide when used alone is effective as an olefin polymerization catalyst at temperatures of less than about 190° C. we were very surprised to discover that the reaction of a dialkyl dihalostannane with a dialkyl aluminum halide gives a product having very active catalytic properties for the polymerization of olefins at temperatures below about 150° C. In addition, it was also surprising for us to learn that molar ratios of at least one mol of dialkyl dihalostannane per mol of dialkyl aluminum halide were necessary in order to obtain polymerization. We found that when using less than one mol of the stannane compound per mol of the aluminum compound in forming the catalyst, the reaction product was substantially ineffective as a polymerization catalyst except at relatively high temperatures in the order of 200° C. or higher.

The dialkyl aluminum halides which can be used as the first component of our catalyst can be illustrated by the general formula

wherein R is an alkyl hydrocarbon group containing 2 to 5 carbon atoms and X is a halogen selected from the group consisting of iodine, chlorine and bromine. The R groups can be the same or different alkyl groups. Examples of dialkyl aluminum halides which can be used are diethyl aluminum halides such as diethyl aluminum chloride or diethyl aluminum bromide; dipropyl aluminum halides such as bromide, chloride or iodide; dibutyl aluminum halides; propyl butyl aluminum halides; ethyl propyl aluminum halides such as ethyl propyl aluminum chloride and dipentyl aluminum halides such as the chlorides and bromides. The dialkyl aluminum chlorides have been found to be more reactive than the dialkyl aluminum bromides or iodides. Thus the dialkyl aluminum chloride is preferred.

The second component of our new catalyst composition is selected from compounds having the general formula

wherein R is an alkyl hydrocarbon group having 3 to 5 carbon atoms and X is a halogen selected from the class of bromine, chloride and iodine. The R groups can be the same or different alkyl groups. Examples of suitable compounds which can be used as a second component are dibutyl dichlorostannane, dibutyl dibromostannane, dipropyl dichlorostannane, dipentyl dibromostannane and dibtuyl chlorobromostannane.

We do not know the exact reason why the use of a molar ratio of at least one mol of stannane per mol of aluminum is critical to the formation of an effective catalyst, however, we have postulated the following reaction to be representative of the reaction between the active components of our catalyst. When using a 1:1 molar ratio, the following reaction appears to occur:

I 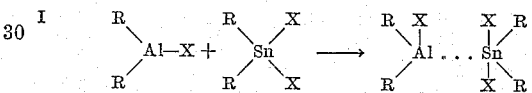

The reaction product or complex of reaction I above is insoluble in saturated hydrocarbon solvent at a temperature below 120° C. and may be readily separated. This complex of the 1:1 molar ratio reaction represents the novel catalyst which we have found to be very effective for dimerization and polymerization of olefins at mild conditions.

Further, we postulate that the reaction product of reacting two mols of the aluminum compound with one mol of the stannane compound appears to give the following reaction:

II 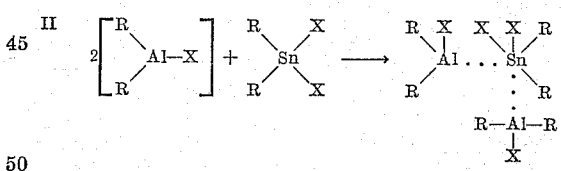

The complex produced in reaction II above has been found to be soluble in saturated hydrocarbon solvent at 25° C. and inactive as a polymerization catalyst.

In the preparation of our catalyst the dialkyl dihalostannane and the dialkyl aluminum halide are reacted in dry hydrocarbon solvent in an amount of at least one mol of stannane per mol of aluminum to form an immiscible colorless liquid which can be separated and used as the catalyst. While it may advantageous to preform our catalyst from these two components, the catalyst can also be made in situ by adding the catalyst components directly to the reaction zone along with a suitable hydrocarbon solvent prior to the addition of the olefin. It is important, however, that at least one mol of stannane compound be used for each mol of aluminum compound, since molar amounts of aluminum compound in excess of the molar amounts of stannane compound will not form an active polymerization catalyst for use at mild temperature and pressure. We have found, generally, that molar ratios of stannane to aluminum from 1:1 to 20:1, respectively, can be used and that molar ratios in the range of 1:1 to 10:1 are satisfactory. The preferred molar ratios of 1:1 to 5:1 of stannane to aluminum, respectively, give the best results since larger amounts of stannane, while not harmful, have not been found to be of any unusual advantage.

To illustrate the importance of the molar ratio of the catalyst components, we reacted diethyl aluminum chloride with dibutyl dichlorostannane in about a 1:1 molar ratio in nonane solvent. The reaction product formed by immediate reaction was an insoluble, colorless liquid. By contrast, the diethyl aluminum chloride alone is infinitely soluble in saturated hydrocarbon solvent, the dibutyl dichlorostannane alone is soluble only to the extent of 100 grams per 100 ml. of saturated hydrocarbon solvent. The insoluble, colorless liquid formed by the above reaction is completely miscible above a temperature of 120° C. in the saturated hydrocarbon solvents and is catalytically active for carrying out the olefin polymerizations by our process. By contrast, when molar ratios of 2:1, 3:1 and 4:1 of aluminum to stannane were used, each of the reaction products were soluble at room temperature in the hydrocarbon solvent and were inactive as polymerization catalyst at temperatures up to 200° C.

Polymerization utilizing our catalyst are conducted in an inert solvent solution. Suitable inert solvents which can be utilized are saturated hydrocarbons such as heptane, octane, nonane, decane and undecane, as well as mixtures thereof or close boiling $C_6$–$C_{12}$ saturated hydrocarbon fractions obtained from petroleum processing. In general, it may be said that any of the well known solvents, including chlorinated hydrocarbons and the like which are inert with respect to the reactants involved and which boil generally within the range of about −44° C. to about 200° C., are likewise suitable in the polymerization reaction. In a preferred practice of the process utilizing the catalyst of our invention the two catalyst components are added to a reactor along with the solvent and the reactor is pressured up with the olefin to be polymerized and heated to reaction temperature. In the case of normally gaseous olefins, the bomb is closed before pressuring and in the case of normally liquid olefins, the olefin is added before closing the reactor. We have found that we obtained oily polymers when $C_2$ to $C_5$ olefins are polymerized at pressures up to 1500 p.s.i.g. and at temperatures below about 190° C., preferably below about 150° C. For convenience of processing temperatures below normal room temperatures of about 25° C. are to be avoided. Thus a polymerization temperature in the range of about 25° C. to about 190° C. gives satisfactory results.

To show the effectiveness of our two-component catalyst over the use of either component alone we performed a series of screening tests. These tests were conducted in 160 ml. stainless steel bombs. In each case the bomb was charged with 0.005 mol of catalyst, 50 ml. of nonane solvent, and 200 to 300 p.s.i.g. of ethylene. The bombs were heated slowly in a mineral oil bath to 200° C. The bombs were frequently agitated and observed at different temperatures for ethylene polymerization activity by observing the pressure drop, if any. The results of these screening tests are shown in the following table:

TABLE 1

*Polymerization activity as measured by ethylene pressure (p.s.i.g.) in bomb vs. temperature (° C.)*

| Catalyst | Temperature, ° C. | | | | | | | | | | |
|---|---|---|---|---|---|---|---|---|---|---|---|
|  | 25 | 80 | 90 | 95 | 120 | 130 | 140 | 160 | 170 | 175 | 200 |
| $(C_4H_9)_2SnCl_2$+$(C_2H_5)_2AlCl$* | 260 |  |  | 300 |  | 150 | 0 |  |  |  |  |
| $(C_4H_9)_2SnCl_2$ | 200 | 250 |  |  | 310 |  |  |  | 380 |  | 410 |
| $(C_2H_5)_2AlCl$ | 240 | 320 |  |  | 420 |  |  |  | 475 |  | 290 |

*1:1 molar ratio of the two components.

An examination of Table 1 shows that when using a 1:1 molar ratio of the two components for our novel catalyst, dibutyl dichlorostannane and diethyl aluminum chloride, that the ethylene pressure in the bomb begins to decrease at 130° C. and is zero pressure by the time the temperature reaches 140° C., thus indicating complete reaction of ethylene below 150° C. By contrast, when using dibutyl dichlorostannane alone, no reaction of ethylene, as indicated by the bomb pressure, occurred when the temperature was raised to as high as 200° C. Further, when using diethyl aluminum chloride as the sole catalyst, no indication of ethylene polymerization was obtained until a temperature of 200° C. had been reached. At 200° C. some reaction occurred. The data in Table 1 clearly show the superiority of our new two-component catalyst over the use of either component alone.

To further demonstrate the usefulness of our new catalyst, the following runs were made:

*Run 1.*—To a 1400 ml. stainless steel bomb were added 11.6 grams (0.0382 mol) of dibutyl dichlorostannane, 4.6 grams (0.0382 mol) of diethyl aluminum chloride and 400 ml. (284.5 grams) of nonane solvent. The bomb was closed and pressured up to 1000 p.s.i.g. with ethylene and the temperature raised to 133° C. and maintained in the range of 133° C. to 137° C. for 5.5 hours. A total product yield of 386 grams was obtained. The product was analyzed and found to have the analysis shown in Table 2.

Under substantially identical conditions as set forth in this Run 1, the use of dibutyl dichlorostannane alone, as well as the use of diethyl aluminum chloride alone, was found to have no polymerization activity.

*Run 2.*—To a 1400 ml. stainless steel bomb were added 13.75 grams (0.045 mol) of dibutyl dichlorostannane, 4.6 grams (0.0382 mol) of diethyl aluminum chloride and 400 ml. of nonane solvent. The bomb was closed and pressured up with 500 p.s.i.g. of ethylene and maintained at 95° C. for 1.5 hours. A total product yield of 264 grams was recovered. The product was analyzed and found to have the analysis shown in Table 2.

*Run 3.*—To a 1400 ml. stainless steel bomb were added 13.4 grams (0.044 mol) of dibutyl dichlorostannane, 5.3 grams (0.044 mol) of diethyl aluminum chloride and 400 ml. undecane. The bomb was closed and pressured up with propylene to 1000 p.s.i.g. and maintained between 120° C. to 190° C. for 2 hours. The maximum pressure reached during the reaction was 1340 p.s.i.g. A total product yield of 87 grams was recovered. The product was analyzed and was found to have the analysis shown in Table 2.

TABLE 2

| Run No. | Olefin | Solvent | Product Distribution, Wt. Percent ||||| 
|---|---|---|---|---|---|---|---|
| | | | $C_4$ | $C_6$ | $C_8$ | $C_9$ | $C_{10+}$ |
| 1 | Ethylene | Nonane | 9.9 | 7.2 | 9.5 | | 73.4 |
| 2 | do | do | 55.8 | 13.8 | 1.7 | | 28.8 |
| 3 | Propylene | Undecane | | 92 | | 8 | |

It can be seen from the above Table 2 that when polymerizing ethylene at a temperature in the range of about 135° C. and a pressure of 1000 p.s.i.g. for a reaction time of about 5.5 hours, a substantial yield of a $C_{10+}$ polymer is obtained. By contrast, in Run 2 where an ethylene polymerization temperature of 95° C. and a pressure of 500 p.s.i.g. were used for a reaction time of 1.5 hours over one-half of the product was the dimer and about 14% was trimer. In Run 3 when polymerizing propylene at a temperature of 120° C. to 190° C. for 2 hours reaction time, 92% of the product was the dimer. Thus it will be appreciated that not only are polymers produced at temperature below 190° C., but by controlling the pressure, temperature and reaction time the extent of polymerization of the polymeric oil obtained can also be controlled.

To illustrate the selective dimerization of our new catalyst the following run was made wherein ethylene was selectively dimerized and the $C_4$ fraction analyzed for specific isomers:

*Run 4.*—To a 1400 ml. stainless steel bomb were added 13.75 grams (0.045 mol) of dibutyl dichlorostannane, 4.6 grams (0.0382 mol) of diethyl aluminum chloride and 400 ml. of nonane solvent. The bomb was closed and pressured to 450 p.s.i.g. with ethylene and maintained at 100° C. to 105° C. for 1.5 hours. The bomb pressure reached a maximum of 500 p.s.i.g. A total product yield of 270 grams was recovered and analyzed. The $C_4$ fraction (165 grams or 61% of the product) consisted of 31% butene-1, 36% trans-butene-2 and 20% cis-butene-2. By comparison under the conditions of Run 1 above, the $C_4$ fraction analyzed only 5.2% butene-1.

Run 4 illustrates that a high percentage of butene-1 can be selectively obtained by polymerizing ethylene at about 100° C. and above 500 p.s.i.g. for a reaction time of about 1.5 hours.

While we have illustrated the polymerization of ethylene and propylene with our novel catalyst, it should be understood that other normally gaseous hydrocarbons can be polymerized in the same manner. By the use of our method polymeric oils may be obtained from normally gaseous olefinic hydrocarbons at very mild temperatures and pressures. In addition, by controlling the reaction conditions we are able to selectively dimerize olefins to produce high yields of specific isomers. Such polymerizations and selective dimerizations have not been heretofore attainable under such mild conditions.

Having thus described our invention, what we claim is:

1. The process for the dimerization and trimerization of olefins, which process comprises contacting olefins selected from the class consisting of ethylene, propylene, and mixtures thereof at temperatures in the range of about 25 to 190° C. and pressures in the range of about atmospheric to 1500 p.s.i.g. with a catalyst consisting essentially of the liquid formed as the product of reacting from about 1 to 5 mols of a dialkyl dihalostannane having the general formula:

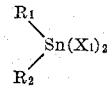

per mol of a dialkyl aluminum halide of the general formula:

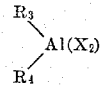

wherein $R_1$ and $R_2$ are alkyl radicals having from 3 to 5 carbon atoms per radical, $X_1$ is selected from the class consisting of chlorine and bromine, $R_3$ and $R_4$ are alkyl radicals having from 2 to 5 carbon atoms per radicals, $X_2$ is selected from the class consisting of chlorine and bromine, said liquid being immiscible at temperatures below about 120° C. in dry saturated hydrocarbon solvents, for a period sufficient to produce dimers and trimers of said olefins as the predominant reaction product thereof.

2. The process of claim 1 wherein said stannane is dibutyl dichlorostannane and said dialkyl aluminum halide is dibutyl aluminum chloride.

References Cited in the file of this patent

UNITED STATES PATENTS

| | | |
|---|---|---|
| 2,935,542 | Minckler et al. | May 3, 1960 |
| 3,036,016 | Gordon et al. | May 22, 1962 |
| 3,090,821 | Voltz | May 21, 1963 |
| 3,118,865 | Bruce et al. | Jan. 21, 1964 |

UNITED STATES PATENT OFFICE
CERTIFICATE OF CORRECTION

Patent No. 3,168,590                      February 2, 1965

Joseph R. Kenton et al.

It is hereby certified that error appears in the above numbered patent requiring correction and that the said Letters Patent should read as corrected below.

Column 2, line 59, after "may" insert -- be --; column 3, line 39, for "Polymerization" read -- Polymerizations --; column 5, line 45, for "above" read -- about --; column 6, line 32, for "radicals", second occurrence, read -- radical --; line 39, for "dibutyly" read -- dibutyl --.

Signed and sealed this 22nd day of June 1965.

(SEAL)
Attest:

ERNEST W. SWIDER                      EDWARD J. BRENNER
Attesting Officer                       Commissioner of Patents